United States Patent [19]

Wright

[11] 4,113,079
[45] Sep. 12, 1978

[54] PRESS BRAKE CONTROL CIRCUIT

[75] Inventor: John T. Wright, Cattaraugus, N.Y.

[73] Assignee: Champion International Corporation, Stamford, Conn.

[21] Appl. No.: 753,647

[22] Filed: Dec. 23, 1976

[51] Int. Cl.² .............................................. F16P 3/22
[52] U.S. Cl. .................................. 192/129 B; 91/424;
100/53; 137/819; 192/131 R; 192/131 H
[58] Field of Search ........... 192/129 R, 129 A, 129 B,
192/131 R, 131 H; 91/424; 137/819; 100/53

[56] References Cited
U.S. PATENT DOCUMENTS

| 3,443,575 | 5/1969 | Hughes | 192/131 R |
|---|---|---|---|
| 3,933,065 | 1/1976 | Janu | 192/131 R X |
| 3,942,432 | 3/1976 | Cantine, Jr. et al. | 100/53 |
| 4,013,002 | 3/1977 | Schneider et al. | 100/53 X |
| 4,026,204 | 5/1977 | Good | 192/131 R X |

Primary Examiner—Allan D. Herrmann
Attorney, Agent, or Firm—Evelyn M. Sommer

[57] ABSTRACT

Logic circuitry in combination with a limit switch on a press automatically controls the operation of the press during the press cycle without visual monitoring of the cycle by an operator.

9 Claims, 1 Drawing Figure

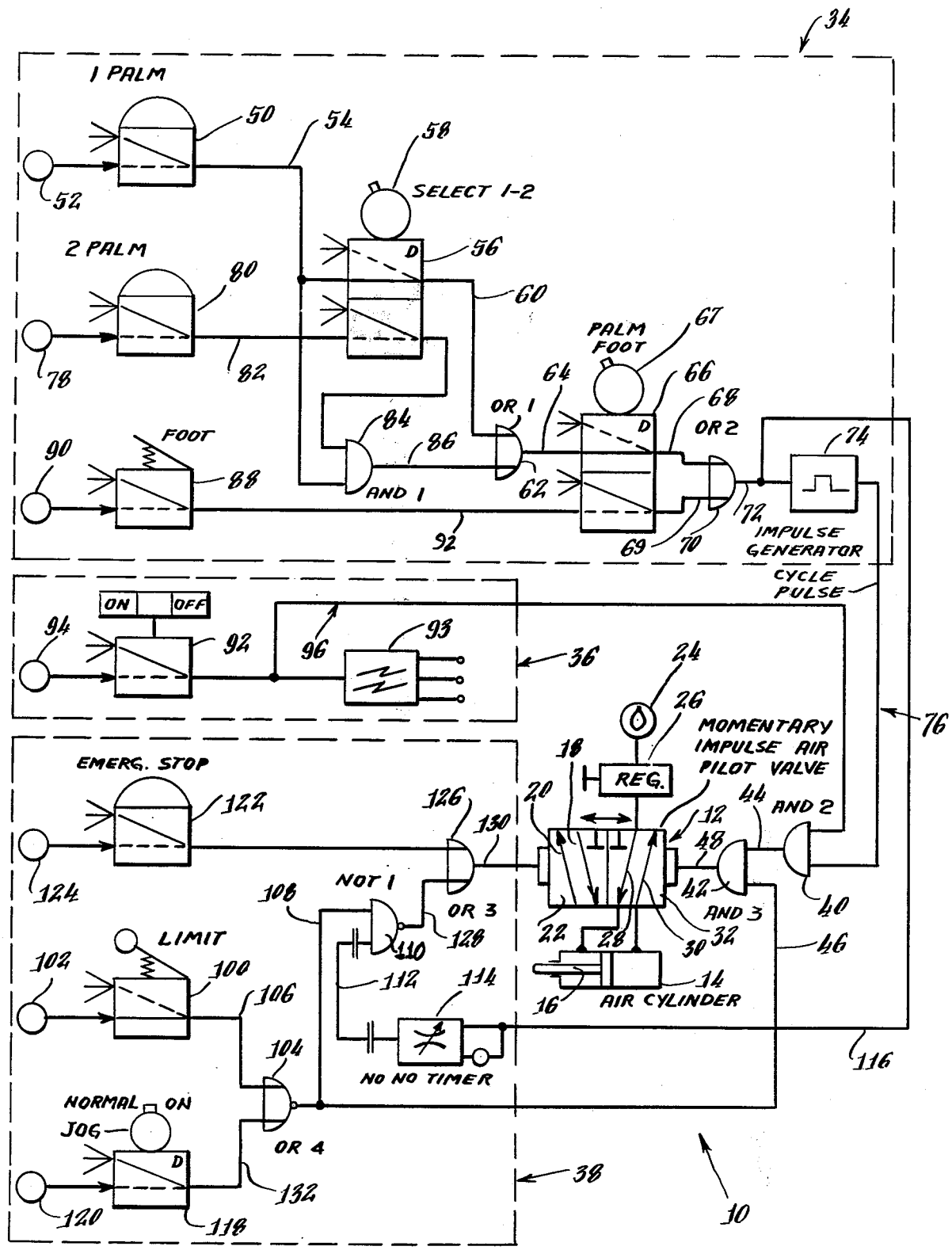

PRESS BRAKE CONTROL CIRCUIT

BACKGROUND OF THE INVENTION

1. Field of the Invention

This invention relates to a fluid control circuit, and more particularly, a fluid control circuit for operating a press having a ram used for punching or bending metals, plastics, or the like.

2. Description of the Prior Art

Heretofore, presses were manually operated by an operator, who engaged a clutch connected to the main drive of the press to cycle the press. The position of the press ram had to be monitored visually by the operator at all times. If a malfunction occurred, the press would have to be stopped by the operator by disconnecting the drive which required releasing the clutch. The reaction time involved, assuming the operator could visually see the malfunctioning of the press, was such that the drive often was not disengaged in time to either preserve the work piece or the press mechanism itself. In some cases, injury to the operator resulted because of the malfunction.

As distinguished from the prior art, the present invention completely automates the press cycle once it is placed in operation by an operator. The position of the press ram is monitored at all times by the control circuit of the invention so that upon sensing a malfunction, the press will automatically shut down until the malfunction is corrected. If no malfunction occurs, the press completes its normal cycle without the operator having to visually monitor the operation. The circuit prevents the cycle from repeating unless the operator releases and redepresses one of the "cycle" switches, or switch pairs, as provided.

SUMMARY OF THE INVENTION

In accordance with the invention, an air motor is provided to pull the clutch into engagement with the drive mechanism of the press to start the press cycle upon receiving a signal from the operator. The air motor includes a cylinder having a slideable piston and the piston is retracted by the signal, which comprises an air pulse, which is supplied to an air pilot valve to shift the valve between one of two positions. In one position, a source of air is connected through a regulator to the piston, to retract the piston to engage the clutch. In its other position, the valve permits flow to the cylinder to extend the piston to disengage the clutch and press drive.

In order for the piston to be retracted, the air pilot valve must be shifted by an air pulse which satisfies the following three conditions within 2 milliseconds: (1) there must be a signal from one or two operators either through a palm switch or a foot switch to an impulse generator for generating a pulse of air; (2) an "on-off" switch which operates the press drive must be at the "on" position; and (3) a limit switch on the press must indicate that the press ram is in its uppermost position ready to commence the cycle. If any of these predetermined conditions inserted in the circuit are not met, the ram will not move.

An impulse generating logic circuit connected to the palm switch or switches (if two operators are to control the cycle) and/or a foot switch is utilized to generate the impulse signal necessary to start the press. An operation control logic circuit is used to check whether the limit switch on the press is depressed indicating that the ram is at the top of its stroke. Once the control circuit self-checks itself that conditions (1), (2) and (3) are satisfied, an air pulse is imparted by the circuit to the air pilot valve to shift the valve to a position permitting air to be admitted to the cylinder to retract the piston to engage the clutch. If the ram does not begin to move immediately indicating that there is a malfunction in the system, a second signal is generated to shift the air pilot valve to a position wherein the piston is extended to release the clutch, thereby shutting down the press. If the ram begins to move and has cleared the circuit check, at the termination of its operating cycle the ram will once again strike and close the limit switch on the press which will cause another air pulse to be sent to the air pilot valve to shift the valve to a position wherein the piston releases the clutch to shut down the operation of the press.

If a malfunction occurs during the cycle of the press, and therefore, the press is shut down, the ram can be returned to the top of the cycle by turning on a jog switch accompanied by repeated depression of the palm or foot switches controlling the initial operation of the press. The ram will be slowly raised in steps or "jogged" to its initial position.

BRIEF DESCRIPTION OF THE DRAWINGS

Further objects and advantages of the invention will become apparent from the following description and claims, and from the accompanying drawing wherein:

The sole FIGURE is a pneumatic schematic diagram of the control circuit of the invention. This schematic can be modified in accordance with known techniques for constructing a control circuit having any of the available logic systems such as electronic logic, electric (relay) logic, fluidic, or pneumatic, as in the case of this description.

DESCRIPTION OF THE PREFERRED EMBODIMENT

Referring now to the drawing in detail, the control circuit of the present invention is used to operate a momentary impulse air pilot valve 12 which admits air to a cylinder 14 to retract or extend a piston 16 to engage or release a clutch (not shown). When engaged, the clutch connects a drive mechanism to a press for cycling the press. The control circuit also checks the operation before and during the cycle of the press.

Should the press malfunction at any point before or during the cycle, the pilot valve 12 is shifted to the right as shown in the FIGURE to connect fluid lines 18 and 20 in a chamber 22 between cylinder 14 and a source of air 24, whose pressure is regulated by a regulator device 26, so that air from source 24 extends piston 16 to release the clutch of the press drive, thereby serving as a brake on the operation of the press. With the lines 28 and 30 in chamber 32 of pilot valve 12 in the position illustrated, source 24 will admit air under pressure through line 28 into cylinder 14, which will exhaust through line 30, to retract piston 16 to engage the clutch and begin cycling the press.

In order to cycle the press, three conditions must be met. A signal in the form of an air pulse must be generated by an impulse generator circuit 34; a second air signal must be present from an "on-off" circuit 36; and an operation control circuit 38 must generate a third pulse to indicate that the ram of the press is in its uppermost position ready to begin a new cycle. The pulses generated by circuits 34 and 36 are passed through an AND gate 40 to a second AND gate 42 via the output line 44 of AND gate 40. The operation control circuit 38 must also send an air pulse through line 46 to AND gate 42 for an output pulse to appear in output line 48 of AND gate 42 to operate the air pilot valve 12 to shift it to the position illustrated. In the position illustrated, piston 16 is retracted to engage the clutch. The operator must hold his button down until circuit 38 can respond. The response time is set by 114 "no-no timer". This requirement to hold the buttons down for several seconds is a safety feature because it prevents accidentally "tripping" the press by accidentally hitting or falling against the palm or foot buttons. This circuit feature requires the palm and foot buttons to be depressed and held momentarily to engage the clutch. This safety feature is highly desirable in preventing accidents to the operators.

The "no-no timer" also adjusts the duration of a "jog" cycle.

Impulse generator circuit 34 can generate the required pulse to AND gate 40 in a variety of ways, depending upon the mode of operation chosen for the press. If the press is to be operated by a sole operator, a palm switch 50 is depressed to admit air from a source 52 through a line 54. A manual air switch 56 operated by a rotatable selection knob 58 can be positioned so as to conduct fluid to a line 60 from line 54. Line 60 constitutes one input to an OR gate 62. Fluid in line 60 is passed through OR gate 62 to an output line 64, feeding one chamber of a second manual air switch 66 whose output is fed via line 68 to a second OR gate 70 to supply air to the output line 72. The air in line 72 will activate an impulse generator 74, which will transmit an output pulse of a specified duration, depending upon the characteristics of the generator 74, via line 76 to the input to AND gate 40.

Alternatively, selection knob 58 can be positioned to open the first switch element and close a second switch element in switch 56 which will pass air transmitted from a source 78 through a second palm switch 80 via line 82 to an AND gate 84. In order for an output pulse to appear in the output line 86 of AND gate 84, the first palm switch 50 must also be depressed at the same time as the second palm switch 80, so that the pulse generated from source 52 will pass to AND gate 84, and gate 84 prevents either signal in 54 or 82, from passing unless both signals are present together and at the same time. The signal from 84 passes through line 86, through "or" 62 and switch 67. The operation of pulse generator 74 is then identical to that described above.

By rotating knob 58 to select a circuit operable only when both palm switches 50 and 80 are depressed, the press can only be activated when two operators are ready to cycle the press. For example, one operator may be at a remote location from the other and when one is ready, the other must also be, in order for the press to commence its cycle.

Yet another alternative available to generate a pulse through line 76 to AND gate 40 is for an operator to depress a foot switch 88 rather than one or both palm switches 50 and 80. Air is admitted through the switch 88 from a source 90. The output line 92 of the foot switch 88 is connected to a second chamber in switch 66 by a manually rotatable knob 67 on the switch 66. The output from switch 66 is fed via a line 69 through OR gate 70 to impulse generator 74, which generates the requisite signal in line 76.

The second condition of the circuit check is met by turning "on" an "on-off" switch 92 to the press drive to activate a motor controller 93. Upon closing of switch 92, an air pulse will be transmitted from a source 94 through line 96 to AND gate 40. When both input lines 96 and 76 to AND gate 40 are operational, an output pulse will be transmitted via line 44 to AND gate 42.

In order to obtain an output signal in the output line 48 from AND gate 42 to supply a momentary pulse to shift air pilot valve 12 to a position enabling air from source 24 to retract piston 16, an air pulse must be supplied to AND gate 42 through line 46. This will be accomplished if the third condition of the circuit check is met, which requires the ram of the press to be in its uppermost position ready to cycle. When the ram of the press is up, a limit switch 100 in the operational control circuit 38 will be closed or depressed enabling air from a source 102 to be transmitted through a line 106 to an OR gate 104. OR gate 104 will transmit the requisite pulse over output line 46 to AND gate 42 satisfying all conditions necessary to shift the pilot valve 12.

If for any reason the ram does not move, for example, if motor 93 is not plugged in or is burnt out, or if the ram is jammed, the clutch will be immediately released by reshifting of air pilot valve 12 to the right. When impulse generator 74 is activated, the pulse from OR gate 70 is tapped from line 72 to a NONO timer 114. NONO timer 114 is a normally open negative output logic element whereupon sensing an input pulse, it will immediately conduct and close after an adjustable, predetermined time interval and not conduct. Accordingly, when impulse generator 74 receives a pulse from OR gate 70, NONO timer 114 will conduct for the predetermined interval and then close.

The output of the NONO timer 114 via a line 112 is connected to the input of a NOT element 110. The output from OR gate 104 is also connected via line 108 to NOT element 110. NOT element 110 will supply an output pulse in a line 128 when NONO timer 114 is not conducting and an input signal or pulse is received in line 108. Accordingly, should the ram not move after passing the circuit check, switch 100 will still be depressed to send air from source 102 through OR gate 104 through line 108 to NOT element 110. Normally, limit switch 100 would be opened as the ram moves before NONO timer 114 finishes its conducting cycle, preventing a pulse from being transmitted to output line 128. However, should the ram still depress limit switch 100 after NONO timer 114 shuts down, NOT element 110 will pass air to line 128 which is connected to an OR gate 126 whose output line 130 will transmit a pulse wherein pilot valve 12 is shifted to the right so as to extend piston 16 to release the clutch and break the drive to the press.

Should the press be functioning correctly, when the ram returns at the end of its cycle to close limit switch 100 again, NONO timer 114 will not be conducting until another pulse is tapped from line 72. Therefore, a signal will be transmitted from source 102 via line 106 through OR gate 104, via line 108, through the NOT element 110, which will conduct because NONO timer 114 is not conducting, line 128, OR gate 126, and output line 130, to shift the pilot valve 12 and shut down operation of the press.

If the ram of the press should stop for any reason after it has begun its travel and is below limit switch 100, the ram may be returned to the top of its cycle by closing a jog switch 118. This feature is highly desirable as a safety precaution because it requires the operators to turn "on" the jog switch in order to get the ram back up to its operating position. In so doing, the operator must stop and think about why the ram stopped. If it is a malfunction jogging through the rest of the cycle will give the operator time to see the malfunction, hopefully. With jog switch 118 on, air will be transmitted from source 120 through a line 132 to OR gate 104. OR gate 104 will supply the necessary pulse through line 46 to AND gate 42 to cause piston 16 to retract as long as switch 92 is "on" and the palm switch 50, or foot switch 88, or the two palm switches 50 and 80 are depressed, as the case may be. The requisite pulse will be supplied through line 48 to shift air pilot valve 12. NONO timer 114 will also be activated when the palm switch 50, or any of the combinations described are depressed, to enable the NOT element 110 to act as an inhibitor preventing the pulse from OR gate 104 from entering line 128 and line 130 to shift the valve 12 to release the piston 16. The jog pulse will be active as long as NONO timer 114 is on. Accordingly, the press ram will jog until timer 114 shuts down in which event NOT element 110 will become active to supply a pulse to line 130 through OR gate 126 to release the clutch. When this occurs, the palm switches or foot switch in impulse generator circuit 34 must again be activated to jog the press. This can be continued until the ram has returned to the top of the cycle.

The controls are set up so there is normally a signal present to stop the press at all times. The presence of this stopping signal is a highly desirable safety feature being sought industry-wide to help prevent accidents to press operators and to the machinery. Current regulations suggest that this type of circuitry is desirable but has heretofore not been generally available to the industry. The presence of the stopping signal prevents an operator from casually operating the press in an unsafe manner; that is, it is hard to bypass the control circuits.

In the event of an emergency during the operation of the press which is viewed by the operator, an emergency palm switch 122 can be closed to supply air from source 124 through OR gate 126 directly to line 130 to shift air pilot valve 12 to the right to extend piston 16, thereby releasing the clutch to the drive.

It will also be apparent from the foregoing that the jog duration is adjustable, that is, by adjusting the length of time in which NONO timer 114 conducts, the amount each jog pulse moves the ram can be varied. Further, the regulator 26 supplying air to clutch cylinder 14 can make the piston 16 press on the clutch either hard or softly. With soft pressure, the clutch slips some, moving the ram at a creep speed. Pressing hard fully engages the clutch for maximum speed.

There are many safety features built into the circuit. The press itself, requires strong clutch pressure to start it moving. If this pressure is removed, the press stops. Accordingly, it takes a definitive coercive force to get the press through one cycle and to begin to move. If air pressure fails, the press will stop. If the air lines leak, the press will stop and as pointed out above, there is normally a signal to stop the press at all times. This signal must be interrupted by the proper combination of "on" signals. These "on" signals are not allowed to activate the press unless the limit switch indicates that the ram is up and ready to go. If the limit switch is jammed, the press will at best only jog. If the line to the limit switch 100 is cut, the press will not even start.

There is also a guard against accidental triggering. If the palm or foot switches are not held down long enough for the ram to clear the limit switch 100, the press will stop once the NONO timer 114 closes.

While a specific embodiment of a press control circuit has been disclosed in the foregoing description, it will be understood that various modifications within the spirit of the invention may occur to those skilled in the art. For example, while the circuit has been disclosed using air logic elements, it should be apparent that an electronic or hydraulic logic system which functions in the identical manner could be used. Further, each of the air sources disclosed could emanate from a single source rather than individual sources. Therefore, it is intended that no limitations be placed on the invention except as defined by the scope of the appended claims.

What is claimed as new is:

1. A control circuit for operating a clutch to engage the drive of a press comprising:
   motor means for engaging and releasing said clutch,
   first logic circuit means responsive to an input signal from a first, second, and third switch means to actuate said motor means to engage said clutch, and
   second logic circuit including means responsive to a second input signal from said third switch means to release said clutch, and
   means responsive to a first input signal from said third switch means for blocking the second input signal to prevent release of the clutch.

2. The control circuit of claim 1 wherein said blocking means includes:
   a NOT logic element connected in series with a NONO timer, said NOT element simultaneously receiving an input signal from said third switch means and NONO timer, the signal from said NONO timer being of a predetermined duration.

3. The control circuit of claim 2 wherein said first logic circuit means includes a fifth switch means for generating a signal in lieu of said third switch means.

4. A control circuit for operating a clutch to engage the drive of a press comprising:
   motor means for engaging and releasing said clutch,
   first switch means comprising at least one operator controlled switch for providing a first signal when actuated and a second signal at all other times;
   second switch means comprising an on-off power switch for providing a first signal when power is applied to the press drive and a second signal at all other times;
   third switch means responsive to a moveable press element being at the top of its stroke to provide a first signal and a second signal at all other times;
   a first set of logic elements responsive to the simultaneous occurrence of first signals from said first switch means, said second switch means and said third switch means to actuate said motor means to engage said clutch; and
   a second set of logic elements having inputs from said first switch means and from said third switch means, said second set of logic elements providing a clutch-releasing signal if the output of said third switch means does not change from the first signal to the second signal within a predetermined period of time after the generation of the first signal by said first switch means.

5. A control circuit as recited in claim 4, further including a fourth switch means connected to said second set of logic elements for providing a clutch-releasing signal whenever said switch is actuated.

6. The control circuit of claim 5 further including a fifth switch means for generating a clutch engaging signal which overrides the signal provided by said third switch means.

7. The control circuit of claim 6 wherein the signal generated by said fifth switch means is of adjustable duration.

8. The control circuit of claim 4 wherein said motor means includes:

a fluid motor having a piston which is retracted and extended to engage and release said clutch, a source of fluid, and a fluid valve means shiftable in response to said input signals from said first and second sets of logic elements to connect said source of fluid to said fluid motor to retract or extend said piston.

9. The control circuit of claim 8 including:

means between said source of fluid and fluid motor for regulating the pressure of the fluid fed through said fluid valve means to said fluid motor.

* * * * *